(12) United States Patent
Beers et al.

(10) Patent No.: US 7,506,108 B2
(45) Date of Patent: Mar. 17, 2009

(54) REQUESTER-GENERATED FORWARD FOR LATE CONFLICTS IN A CACHE COHERENCY PROTOCOL

(75) Inventors: Robert Beers, Beaverton, OR (US); Herbert Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 11/479,179

(22) Filed: Jun. 30, 2006

(65) Prior Publication Data

US 2008/0005482 A1 Jan. 3, 2008

(51) Int. Cl.
G06F 12/14 (2006.01)
G06F 12/10 (2006.01)

(52) U.S. Cl. ....................... 711/147; 711/141
(58) Field of Classification Search .................. None
See application file for complete search history.

(56) References Cited

U.S. PATENT DOCUMENTS

| | | | |
|---|---|---|---|
| 5,966,729 A | 10/1999 | Phelps | |
| 6,009,488 A | 12/1999 | Kavipurapu | |
| 6,631,401 B1 | 10/2003 | Keller et al. | |
| 6,631,448 B2 | 10/2003 | Weber | |
| 6,704,842 B1 | 3/2004 | Janakiraman et al. | |
| 6,922,756 B2 | 7/2005 | Hum et al. | |
| 6,954,829 B2 * | 10/2005 | Beers et al. | 711/141 |
| 7,107,409 B2 | 9/2006 | Glasco | |
| 2004/0122966 A1 | 6/2004 | Hum et al. | |
| 2004/0123045 A1 | 6/2004 | Hum et al. | |
| 2004/0123047 A1 | 6/2004 | Hum et al. | |
| 2005/0144400 A1 | 6/2005 | Hum et al. | |
| 2005/0237941 A1 | 10/2005 | Hum et al. | |
| 2005/0240734 A1 | 10/2005 | Batson et al. | |
| 2006/0053257 A1 | 3/2006 | Sistla et al. | |

OTHER PUBLICATIONS

Pending U.S. Appl. No. 11/447,384, filed Jun. 5, 2006; Inventor: Hum et al.
USPTO, "42P23773 OA Mailed Jun. 16, 2008 for U.S. Appl. No. 11/479,576", Whole Document.
Office Action for U.S. Appl. No. 11/480,102 mailed May 23, 2008, 13 pgs.

* cited by examiner

*Primary Examiner*—Hyung S Sough
*Assistant Examiner*—Duc T Doan
(74) *Attorney, Agent, or Firm*—Blakely, Sokoloff, Taylor & Zafman LLP (57) ABSTRACT

A method for resolving data request conflicts in a cache coherency protocol for multiple caching agents using requester-generated data forwards. In one embodiment, a caching agent stores information used to auto-generate a forward of data received in response to a data request.

19 Claims, 6 Drawing Sheets

REQUESTER-GENERATED FORWARD FOR LATE CONFLICTS IN A CACHE COHERENCY PROTOCOL

RELATED APPLICATIONS

The present U.S. patent application is related to the following U.S. patent applications filed concurrently:

(1) application Ser. No. 11/479,576, filed Jun. 30, 2006, entitled "REPEATED CONFLICT ACKNOWLEDGEMENTS IN A CACHE COHERENCY PROTOCOL." and (2) application Ser. No. 11/480,102, filed Jun. 30, 2006, entitled "RE-SNOOP FOR CONFLICT RESOLUTION IN A CACHE COHERENCY PROTOCOL."

BACKGROUND OF THE INVENTION

1. Field of the Invention

The invention relates to cache memories. More particularly, the invention relates to distributed conflict resolution in a system having multiple caching agents.

2. Background Art

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases reliance on a single component for conflict resolution can decrease overall system performance.

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are more scalable, but require more complex responses, often involving three nodes in point-to-point communications.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. Furthermore, the invention is described herein with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used.

Figure 1:
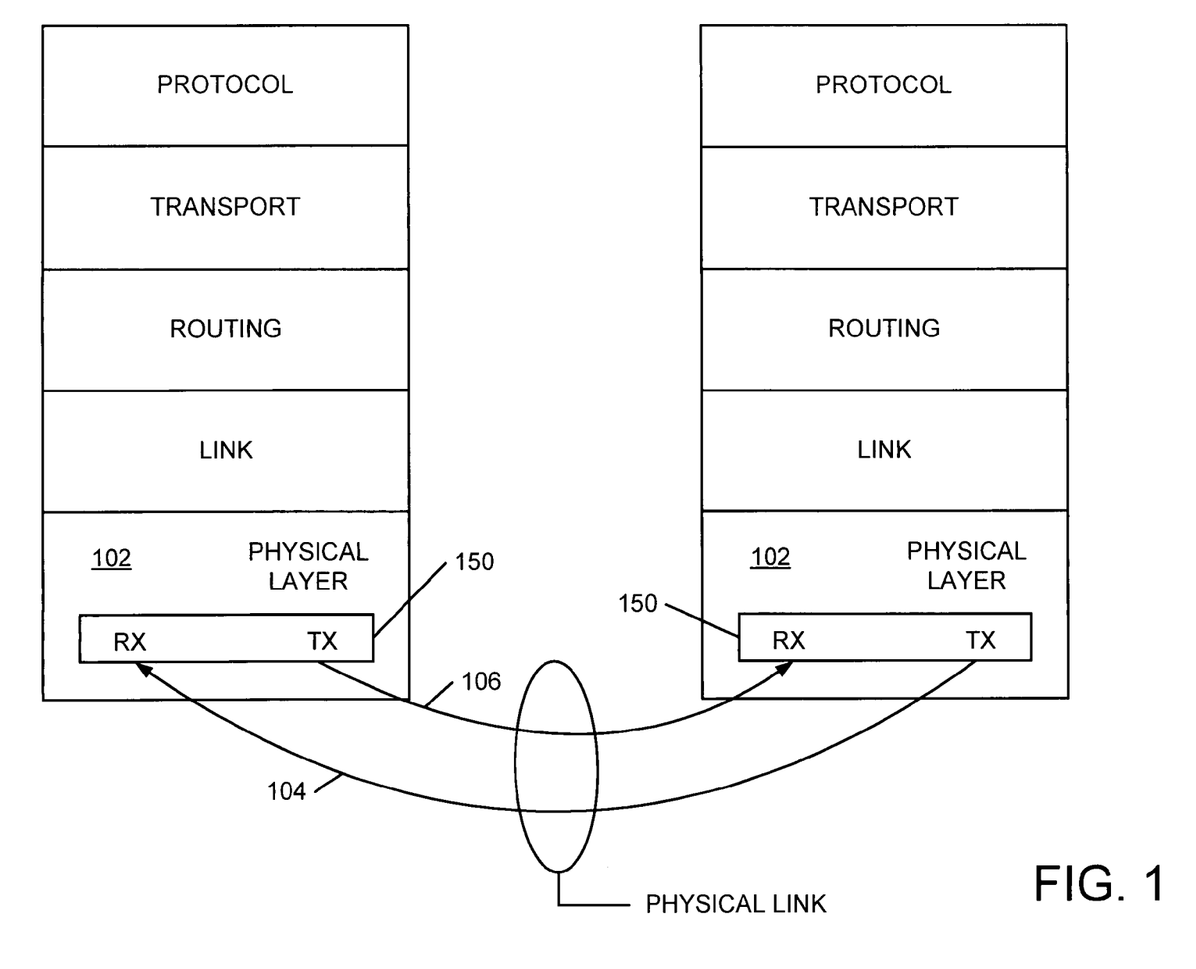
FIG. 1 is a block diagram of on embodiment of an apparatus for a physical interconnect.

Techniques for conflict resolution in a cache coherence protocol in a multi-node system are described. For example, a cache coherence protocol can be a two-hop protocol that utilizes a messaging protocol from referenced U.S. Patent Application 2005/0262250 for implementing a coherent memory system using agents in a network fabric. One example of a network fabric may comprise either or all of: a link layer, a protocol layer, a routing layer, a transport layer, and a physical layer. The fabric facilitates transporting messages from one protocol (home or caching agent) to another protocol for a point to point network. FIG. 1 depicts an underlying network for one embodiment of the invention.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device.

Specifically, the physical layer 102 may provide communication between two ports over a physical interconnect comprising two uni-directional links. Specifically, one uni-directional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
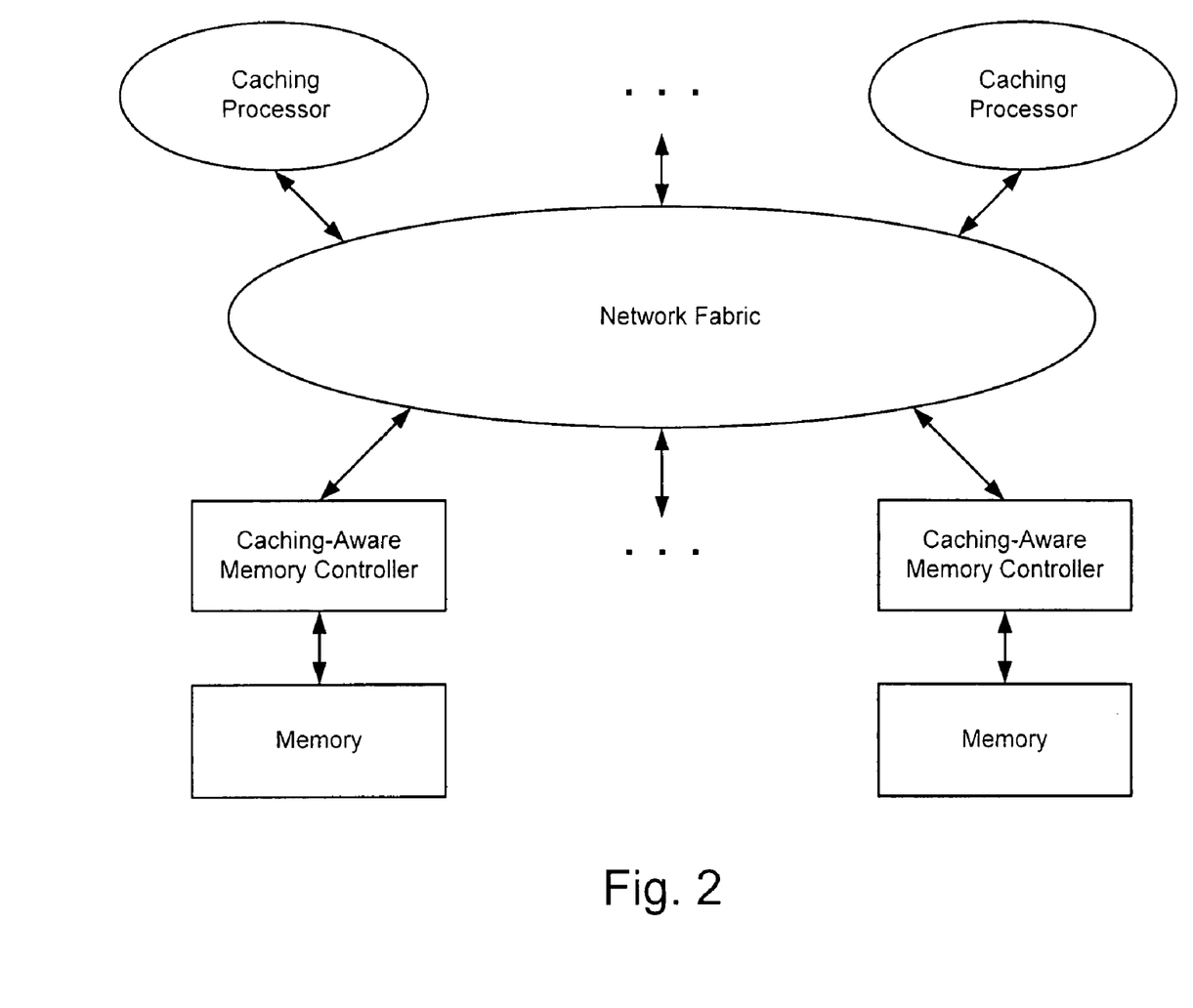
FIG. 2 is a conceptual illustration of one embodiment of a system that may utilize point-to-point interconnects.

FIG. 2 is a conceptual illustration of one embodiment of a system that may utilize point-to-point interconnects. Each point-to-point link illustrated in FIG. 2 may be implemented as described in FIG. 1. In one embodiment, the system of FIG. 2 may utilize a point-to-point architecture that supports a layered protocol scheme. In one embodiment, the system may include a plurality of caching agents, home agents, and input/output (I/O) agents coupled to a network fabric. For example, the network fabric may adhere to a layered protocol scheme and comprised of: a physical layer, a link layer, a routing layer, a transport layer and a protocol layer (as depicted in connection with FIG. 1).

FIG. 2 is a high level, simplified abstraction of a protocol architecture that may utilize one or more point-to-point links. The fabric may facilitate transporting messages between system agents (e.g., caching processor or caching aware memory controller) to other system agents utilizing point-to-point links. Each caching-aware memory controller may be coupled with memory that may include, for example, dynamic random access memory (DRAM), flash memory, or any other type of memory known in the art.

In general, a cache coherency protocol requires conflict resolution in order to provide orderly changes of state for the various cache lines or other blocks of data. A conflict resolution technique described herein provides sequential consistency, which means that only a single, modifiable copy of a cache line can be present at any time, and that no copy of a cache line can be modified while other copies are readable. Conflicting requests to modify a copy of a cache line must, therefore, be resolved in order to maintain sequential consistency.

In the Common System Interface (CSI) cache coherence protocol, for example, a caching agent's coherent request goes through two phases: Request phase and AckCnflt phase. The former is initiated when the request is sent to the Home agent and ended when it receives its data and completion message from the Home agent or, in the case of a conflict, when it sends its conflict acknowledgement packet to the Home agent. The AckCnflt phase is initiated only when a conflict acknowledgement packet is sent. It ends when a forward request message or a second completion message is received.

During an AckCnflt phase for one of its requests, a caching agent must not respond to external snoop requests to the same address as the request. The reason for this is to help the Home agent with its conflict resolution duties by not inadvertently introducing further conflicts. The CSI cache coherence protocol uses the AckCnflt handshake between caching agents and the home agent to resolve conflicts and the forwarding of data between requests. During an AckCnflt phase, the Home agent is trying to extend ownership to known conflicts or end the conflict chaining (so that snoops may again try to invoke direct cache-to-cache transfers). When the Home agent or Peer agent (making a request) detects a conflict case, the caching agent will respond to the Home agent's request-completion message with an AckCnflt. This message's arrival at the Home agent triggers the algorithms for determining whether a forward request must be generated and picking a request to forward to. After an AckCnflt, the Home agent responds with either Cmp (when no forward is necessary) or CmpFwd[fwdee] (when a forward is necessary and a forwardee is selected).

Blocking snoops introduces delays in releasing resources and, with limited resources available for snoops, increases the difficulty of avoiding system deadlocks. An embodiment of the invention provides a variant of the CSI cache coherence protocol that avoids the AckCnflt phase by means of requesting agents generating forward requests for late conflict responses and moving the forwarding algorithm to the request completion stage in the Home agent.

Figure 3:
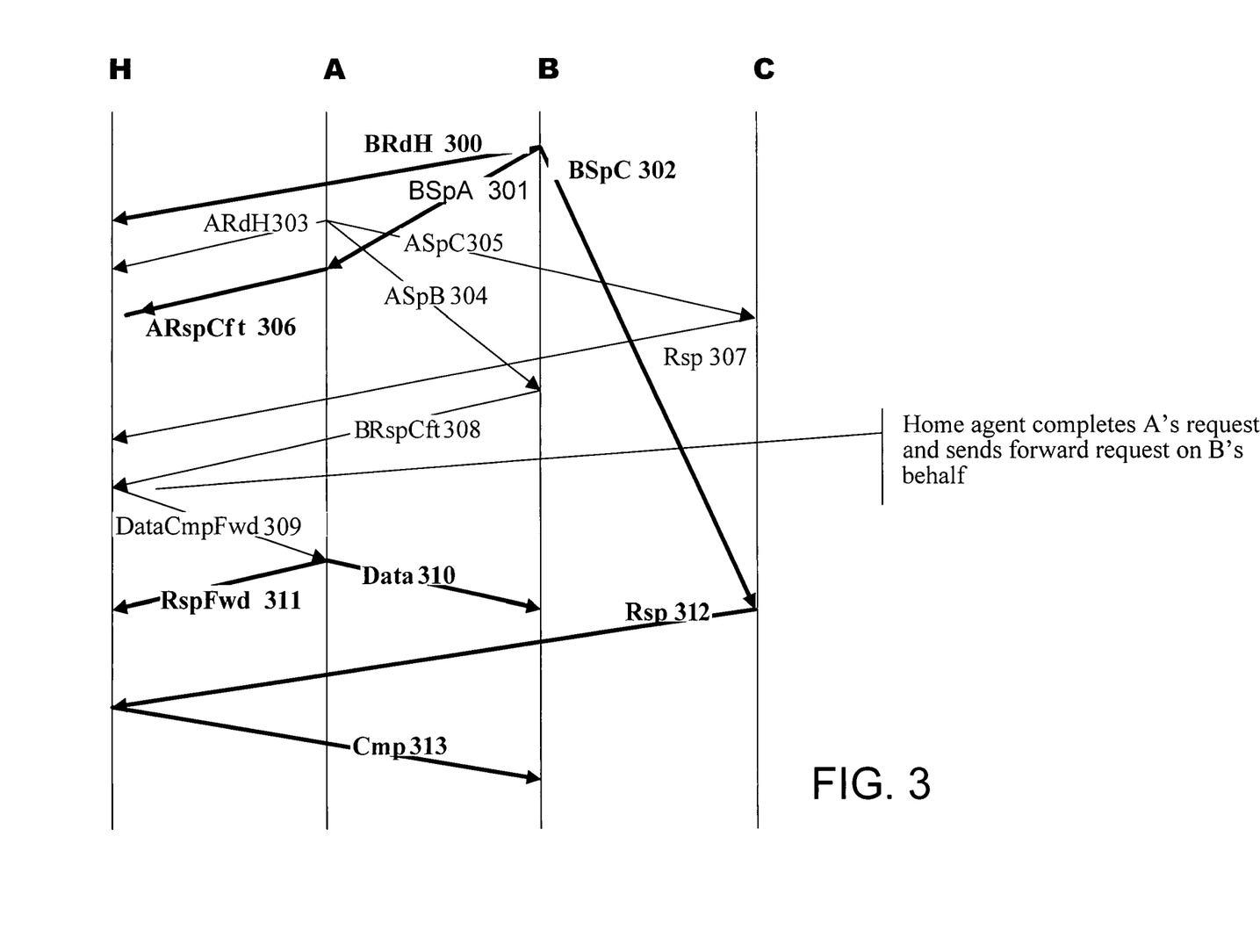
FIG. 3 is a timing diagram showing an example of a normal conflict scenario.

FIG. 3 shows an example of how an embodiment of the invention handles normal conflict conditions. In this example, home node H is responsible for resolving data request conflicts for peer nodes A, B and C. Peer B broadcasts a data request comprising a read to home H, BRdH 300, a snoop to peer A, BSpA 301, and a snoop to peer C BSpC 302. While the data request of peer B awaits a response, peer A also broadcasts its own data request comprising ARdH 303, ASpB 304, and ASpC 305, which conflict with the data request of peer B. In an embodiment of the invention, when a requester peer receives a conflicting request from a peer node, the requester stores an identifier for this conflicter peer for use in generating information (Fwd) needed to forward to a peer node the data received as part of a response to the data request. The identifier for this conflicter peer may include a task identifier and a node identifier.

When a peer with a pending data request receives a snoop from another peer which conflicts with the data request, the requester peer sends to the home H a conflict response message (RspCft). In the case of FIG. 3, peers A and B send to home H conflict response messages ARspCft 306 and BRspCft 308, respectively. In an embodiment of the invention, a requester's RspCft to home H will include the identifier for the conflicter peer mentioned above.

In one embodiment, the identifier for a conflicter peer which is included in a RspCft may be stored by home H for use in handling the request conflict. Home H will store this identifier where the data request of the peer node that sent the RspCft is still active, i.e. where home H has not yet issued an indication (Cmp) that the response to the requester peer's data request is complete. In one embodiment, home H uses a tracker entry for the requester peer to store the identifier for the conflicter peer that is included in the requester peer's RspCft.

In responding to conflicting data requests, home H sends to a requestor node a response which includes the requested data (Data) and a Cmp. When home H can derive forwarding information (Fwd) from the RspCft previously received from the requester peer receiving the response, Fwd is included with Cmp. Fwd will then be used by the requester peer receiving the response to forward a copy of Data to one or more of that peer's conflicter peers.

In generating the Fwd, home H will use the identifier for the conflicter peer contained in the last RspCft that sent. In one embodiment, the home node uses available conflicter node identifiers where they are available at the home node. Where such information is not available at the home node, the home node includes with the response the identifier for the conflicter node of the last received conflict message sent. Where the identifier sent in the response to a requestor node does not correspond to the identifier for the conflicter node stored at the requestor node receiving the response, the requestor node receiving the response will generate forwarding information using the identifier for the conflicter node which it has stored.

In this scenario, ARspCft 306 and BRspCft 308 are received while home H generates a response to peer A. Since H is responding to node A and ARspCft has been received, H can include the identifier for the conflicter peer of peer A, i.e. peer B, as part of the Fwd in DataCmpFwd 309. Upon receiving DataCmpFwd 309, peer A compares the Fwd to the identifier for the conflicter peer it stored when it was first snooped by the conflicter peer. In this case, Fwd and the stored identifier in peer A are the same, and so Fwd can be used to direct the forwarding of a copy of Data to the conflicter peer. Otherwise, peer A uses the stored identifier to generate Fwd for itself, and forward Data according to its auto-generated Fwd.

Figure 4:
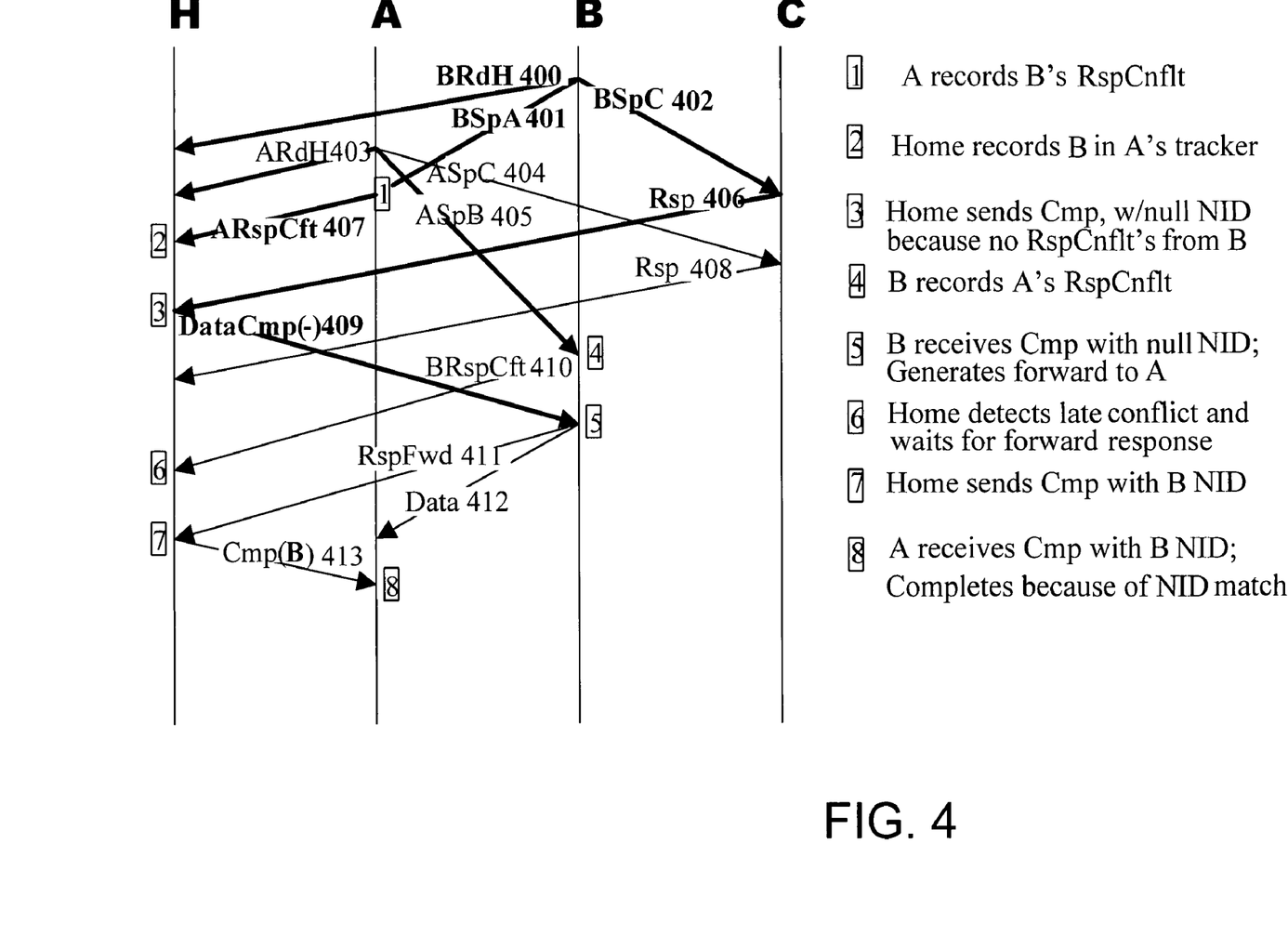
FIG. 4 is a timing diagram showing an example of a late conflict scenario.

FIG. 4 illustrates one example of such an algorithm operating for the basic late conflict scenario. In a "late conflict" scenario, the chance to send a forward request to the previous owner has passed. A requester peer node knows it sent a conflict response message and the Home knows it sent a signal indicating a complete response (Cmp); however, these two messages pass each other on the link layer.

As with the normal conflict scenario, home H resolves data request conflicts for peers A, B and C. Peer B issues BRdH 400, BSpA 401, and BSpC 402, while peer A issues the conflicting ARdH 403, ASpB 405, and ASpC 404. Upon learning of the conflicting data requests, requester peers A and B both store an identifier for their respective conflicter peers, and include these identifiers in their respective conflict response messages ARspCft 407 and BRspCft 410. Where home H receives a RspCft from a requester peer whose data request is active, an identifier for a conflicter peer contained in the RspCft is saved by home H.

In the late conflict scenario, a BRspCft 410 has not arrived by the time home H is ready to send a response to peer B. However, instead of waiting for BRspCft 410, home H can send a response DataCmp(−) 409 which causes peer B to auto-generate its Fwd. In one embodiment, home H merely includes a null value with Cmp. Upon peer B determining that the null value accompanying Cmp does not compare to the stored identifier for its conflicter peer, peer B will use the stored identifier to generate its own Fwd.

FIG. 4 shows how requester-generated forwards allow home H to provide conflict resolution without waiting for a given RspCft, reducing both latency and the number of data packets by avoiding transactions like that found in the Ack-Cnflt stage of the CSI cache coherency protocol.

Figure 5:
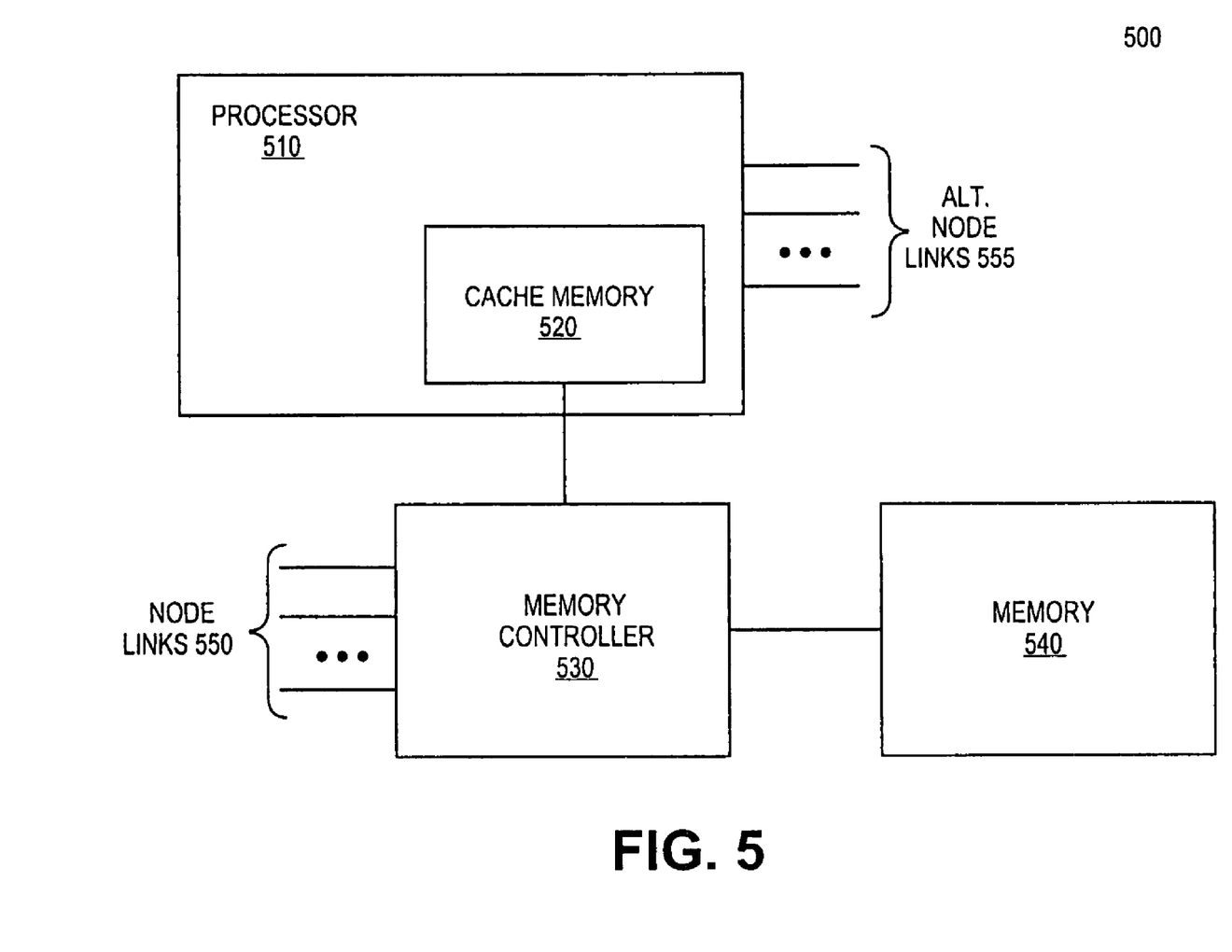
FIG. 5 is a block diagram of one embodiment of a node.

FIG. 5 is a block diagram of one embodiment of a node. Node 500 is illustrated with a single processor, cache memory, memory controller and memory; however, any number of any of these components can be included in a node. Further, additional and/or different components (e.g., a bus bridge) can also be included in a node. Processor 510 can be any type of processor known in the art. In one embodiment, processor 510 includes cache memory 520. In alternate embodiments, cache memory 520 is external to processor 510, or additional cache memories can be included that are internal or external to processor 510.

Memory controller 530 is coupled with cache memory 520 and memory 540. Memory controller 530 operates as an interface between cache memory 520 and memory 540. In one embodiment, memory controller 530 maintains cache coherency using the requester-generated forward described herein. Memory controller 530 interacts with other nodes via node links 550. In an alternate embodiment, processor 510 interacts with memory controller 530 to maintain cache coherency as described herein and processor 510 interacts with other nodes via alternative node links 555.

In one embodiment, node links 550 include a dedicated interface for each node with which node 500 interacts. In an alternate embodiment, node links 550 include a number of interfaces that is different than the number of nodes with which node 500 interacts. In one embodiment, node 500 interacts with one or more agents that represent multiple nodes.

Figure 6:
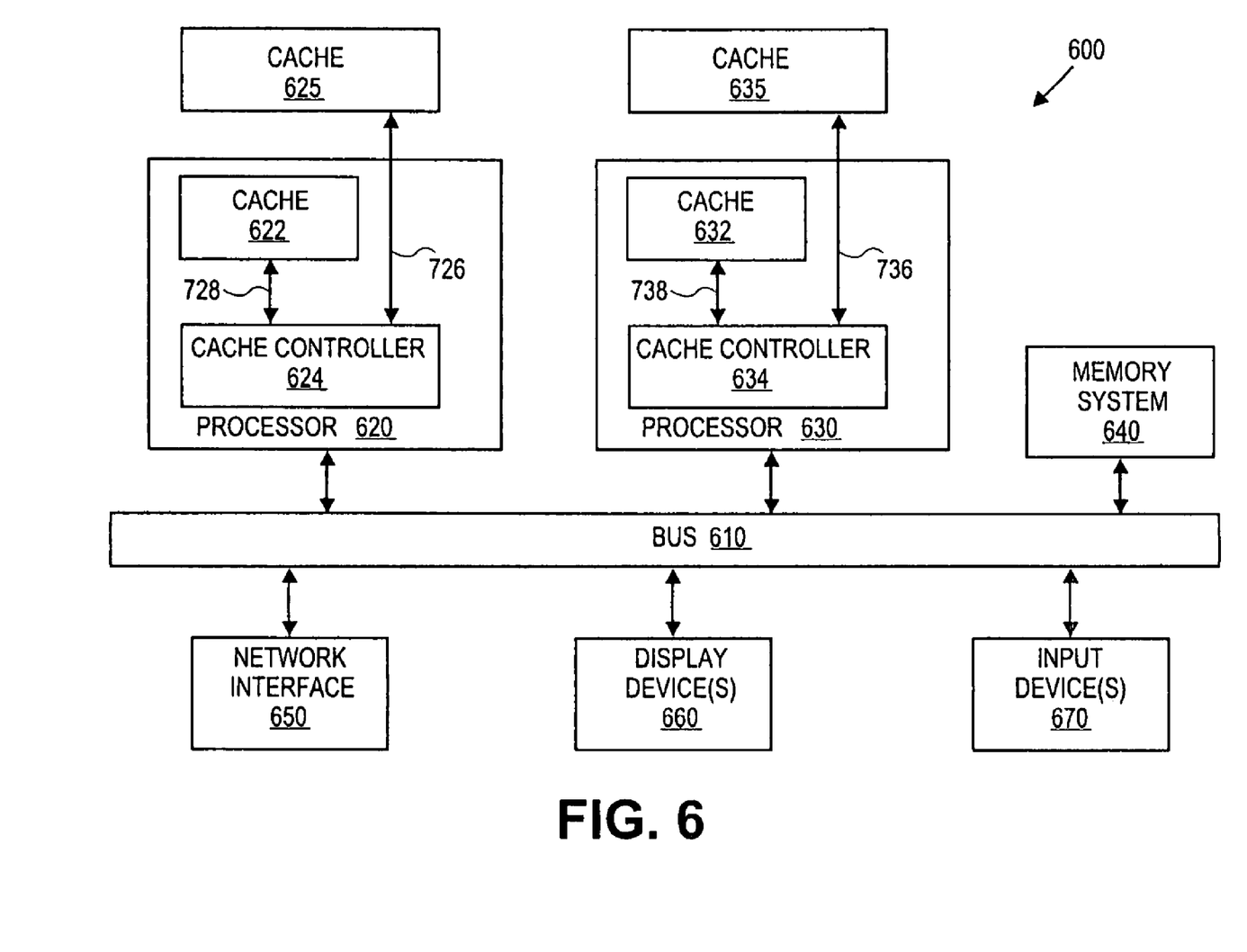
FIG. 6 is a block diagram of one embodiment of a multi-processor system.

FIG. 6 is one embodiment of a multiprocessor system. Multiprocessor system 600 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 600 can be configured to operate as a multi-node system.

Multiprocessor system 600 includes bus system 610 or other communication device(s) to communicate information. Bus system 610 can include any number of buses and associated interconnection circuitry, for example, bus bridges. Processor 620 is coupled with bus system 610 to process information. Processor 620 can include cache memory 622, for example a level zero (L0) cache memory, and cache controller 624. In one embodiment, processor 620 is also coupled with cache 625, which can be any type of cache memory. In an alternate embodiment, cache 625 can be coupled with bus system 610. Other types of processor-cache configurations can also be used.

In one embodiment, cache controller 624 is coupled with cache memory 622 via cache memory interface 628, which can be, for example, a bus internal to processor 620. Cache controller is coupled with cache memory 625 via cache interface 626, which provides an interface between processor 620 and an external cache memory.

Multiprocessor system 600 further includes processor 630 with cache memory 632 and cache controller 634. Cache controller 634 is coupled with cache memory 632 via cache interface 638. Similarly, cache controller 634 is coupled with cache memory 635 via cache interface 636. In one embodiment, cache memory 635 is coupled with processor 630.

While multiprocessor system 600 is illustrated with two processors, multiprocessor system 600 can include any number of processors and/or co-processors. Multiprocessor system 600 further includes memory system 640 coupled with bus system 610. Memory system 640 can include any combination of dynamic (e.g., random access memory) and static (e.g., read-only memory, CD-ROM, disk storage, flash memory) memory devices and associated drives, where appropriate. The memory devices of memory system 640 are used to store information and instructions to be executed by processors of multiprocessor system 600. Memory system 640 also can be used to store temporary variables or other intermediate information during execution of instructions by the processors.

Instructions can be provided to memory system 640 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 600 further includes network interface 650 to provide access to a network, such as a local area network and/or the Internet. Network interface 650 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 600 can also include display device 660, such as a cathode ray tube (CRT) or liquid crystal display (LCD), to display information. Input device(s) 670, including, for example, a keyboard having alphanumeric and other keys, is typically coupled to bus 610 to communicate information and command selections to processors 620 and/or 630. Another type of user input device is a cursor control device, such as a mouse, a trackball, or cursor direction keys to communicate direction information and command selections to processors 620 and 630 and to control cursor movement on display device 660.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

What is claimed is:

1. A method comprising:
    storing at a requester node in a multi-node group a first conflicter node identifier for a conflicter node of the requester node, a data request of the requestor node conflicting with a data request of the conflicter node;
    sending from the home node to the requester node a response to the data request of the requester node, the response including a message Cmp indicating a completed response to the data request of the requester node, if a first determination at the home node indicates that a second conflicter node identifier has been saved at the home node, the message Cmp further including a derived conflicter node identifier derived from the saved second conflicter node identifier, the derived conflicter node identifier to direct a forwarding of a copy of the data from the requester node to a conflicter node;
    making a second determination at the requester node whether the derived conflicter node identifier in the message Cmp corresponds to the stored first conflicter node identifier; and
    generating forwarding information at the requester node in response to determining that the derived conflicter node identifier in the message Cmp does not correspond to the stored first conflicter node identifier, the generated forwarding information based at least in part on the stored first conflicter node identifier, the generated forwarding information to direct a forwarding of a copy of data from the requestor node.

2. The method of claim 1 wherein a conflicter node identifier includes a task identifier.

3. The method of claim 1, further comprising:
    sending from one or more requester nodes to the home node one or more conflicter node identifiers each for a conflicter node of a requester node sending the each identifier, each sending of a conflicter node identifier in response to a respective data request for a copy of the data requested by the requester node sending the each identifier; and
    saving at the home node a conflicter node identifier sent from one of the one or more requester nodes, where the one of the one or more requester nodes has an active request for a copy of the data.

4. The method of claim 3 wherein saving at the home node a conflicter node identifier sent from one of the one or more requester nodes comprises saving the conflicter node identifier in a tracker entry for the one of the one or more requester nodes.

5. The method of claim 1 wherein each node in the multi-node group is interconnected with a bi-directional point-to-point link and each node communicates with each other node in the multi-node group.

6. A method comprising:
    at a home node in a multi-node group, receiving from one or more requester nodes in the multi-node group, one or more first conflicter node identifiers each for a respective conflicter node of a requester node sending the each identifier, each sending of a first conflicter node identifier in response to a respective data request for a copy of the data requested by the requester node sending the each identifier;
    sending to a first requester node a response to a data request of the first requester node, the response including a message Cmp indicating a completed response to the data request of the first requester node; and
    omitting from the Cmp message a second conflicter node identifier derived from one of the first conflicter node identifiers, the omitting in response to determining at the home node that the one of the first conflicter node identifiers has not been saved at the home node, the second conflicter node identifier to be derived at the first requester node, the derived second conflicter node identifier to direct the forwarding of a copy of the data from the first requester node to a first conflicter node.

7. The method of claim 6, wherein a conflicter node identifier includes a task identifier.

8. The method of claim 6 wherein each node in the multi-node group is interconnected with a bi-directional point-to-point link and each node communicates with each other node in the multi-node group.

9. A method comprising:
    broadcasting a data request in a multi-node group;
    storing a first conflicter node identifier for a conflicter node in the multi-node group, the data request conflicting with a data request of the conflicter node;
    sending to a home node in the multi-node group a conflicter node identifier for the conflicter node in response to the conflicting data request of the conflicter node;
    receiving from the home node a response to the broadcast data request, the response including a message Cmp indicating a completed response to the broadcast data request;
    making a determination whether the message Cmp includes a second conflicter node identifier corresponding to the stored first conflicter node identifier for the conflicter node, the second conflicter node identifier to direct a forwarding of data to a conflicter node; and generating a third conflicter node identifier where the message Cmp does not include the second conflicter node identifier corresponding to the stored first conflicter node identifier for the conflicter node, the generated third conflicter node identifier based at least in part on the stored first conflicter node identifier for the conflicter node.

10. The method of claim 9, wherein a conflicter node identifier includes a task identifier.

11. The method of claim 9 wherein each node in the multi-node group is interconnected with a bi-directional point-to-point link and each node communicates with each other node in the multi-node group.

12. A computerized system comprising:

a first peer node having a first cache memory to request a block of data not stored in the first cache memory by broadcasting a first request for a block of data to one or more nodes in the system;

a second peer node having a second cache memory to request a block of data not stored in the second cache memory by broadcasting a second request for a block of data to one or more nodes in the system, the second peer node further to store a first conflicter node identifier for the first peer node in response to a conflict between the first and second requests, the second peer node further to generate a second conflicter node identifier to direct a forwarding of data by the second peer node, the generating the second conflicter node identifier where a Cmp message indicating a complete response to the second request includes a third conflicter node identifier that does not correspond to the stored first conflicter node identifier; and a home agent to receive from the second peer node a conflict message indicating the conflict between the first and second requests, the conflict message including a fourth conflicter node identifier for the first peer node, the home agent further to send to the second peer node the Cmp message indicating the complete response to the second request, the Cmp message further including the third conflicter node identifier where a determination by the home agent indicates that a conflicter node identifier corresponding to the third conflicter node identifier has been saved at the home agent; and a dynamic random access memory coupled to the home agent to store a block of data.

13. The computerized system of claim 12 wherein a conflicter node identifier includes a task identifier.

14. The computerized system of claim 12 wherein each of the first and second peer nodes and the home agent is both interconnected with a bi-directional point-to-point link and in communication with each other node.

15. The computerized system of claim 12, the home agent further to save the identifier for the first peer node sent from the second peer node, where the home agent has not completed a response to the conflicting request of the second peer node.

16. An apparatus comprising:

a first peer node having a first cache memory to request a block of data not stored in the first cache memory by broadcasting a first request for a block of data to one or more nodes in the system;

a second peer node having a second cache memory to request a block of data not stored in the second cache memory by broadcasting a second request for a block of data to one or more nodes in the system, the second peer node further to store a first conflicter node identifier for the first peer node in response to a conflict between the first and second requests, the second peer node further to generate a second conflicter node identifier to direct a forwarding of data by the second peer node, the generating the second conflicter node identifier where a Cmp message indicating a complete response to the second request includes a third conflicter node identifier that does not correspond to the stored first conflicter node identifier; and a home agent to receive from the second peer node a conflict message indicating the conflict between the first and second requests, the conflict message including a fourth conflicter node identifier for the first peer node, the home agent further to send to the second peer node the Cmp message indicating the complete response to the second request, the Cmp message further including the third conflicter node identifier where a determination by the home agent indicates that a conflicter node identifier corresponding to the third conflicter node identifier has been saved at the home agent.

17. The apparatus of claim 16 wherein a conflicter node identifier includes a task identifier.

18. The apparatus of claim 16 wherein each of the first and second peer nodes and the home agent is both interconnected with a bi-directional point-to-point link and in communication with each other node.

19. The apparatus of claim 16, the home agent further to save the identifier for the first peer node sent from the second peer node, where the home agent has not completed a response to the conflicting request of the second peer node.

* * * * *